(12) United States Patent  (10) Patent No.: US 6,332,977 B1
Janecek  (45) Date of Patent: Dec. 25, 2001

(54) APPARATUS FOR STEAM STERILIZING AND RECYCLING LEAF-FILTER AIDS

(75) Inventor: Kenneth F. Janecek, Hamburg, NY (US)

(73) Assignee: ACS Acquisitions Corp., Coral Springs, FL (US)

( * ) Notice: Subject to any disclaimer, the term of this patent is extended or adjusted under 35 U.S.C. 154(b) by 0 days.

(21) Appl. No.: 09/322,551

(22) Filed: May 28, 1999

(51) Int. Cl.⁷ .................................................. B01D 25/32
(52) U.S. Cl. .................. 210/96.1; 210/149; 210/177; 210/193; 210/332; 210/391; 210/409; 422/109
(58) Field of Search .................... 210/739, 742, 210/770, 771, 772, 791, 797, 96.1, 149, 193, 332, 391, 409, 177; 422/26, 109, 112

(56) References Cited

U.S. PATENT DOCUMENTS

| | | |
|---|---|---|
| 1,831,433 | 11/1931 | Zoul . |
| 3,831,746 | 8/1974 | Wilson et al. ............................. 209/2 |
| 4,310,422 | 1/1982 | Romey et al. ........................ 210/769 |
| 4,547,296 * | 10/1985 | Sim et al. .............................. 210/778 |
| 4,737,285 * | 4/1988 | Krulitsch et al. ..................... 210/230 |
| 4,830,747 * | 5/1989 | Kubota et al. ........................ 210/203 |
| 4,840,769 | 6/1989 | Nejigaki et al. ......................... 422/26 |
| 4,968,423 | 11/1990 | McKale et al. ........................ 210/346 |
| 5,141,638 * | 8/1992 | Mori et al. .......................... 210/257.1 |
| 5,271,851 * | 12/1993 | Nelson et al. ......................... 210/770 |
| 5,466,417 | 11/1995 | Seki ...................................... 422/109 |
| 5,484,510 | 1/1996 | Hartman et al. ...................... 202/162 |
| 5,895,565 * | 4/1999 | Steininger et al. ...................... 210/85 |

* cited by examiner

Primary Examiner—Peter A. Hruskoci (57) ABSTRACT

Steaming filter aid cakes in-place in a pressure leaf filter is a simple, inexpensive, and reliable technique for insuring that all collected pathogens are destroyed and never released back into the environment. Filter aids including diatomaceous earth reduce giardia and cryptosporidium by at least 6 logs. D.E. filtration allows the flexibility to adjust the dosage for bodyfeed and the grade to suit changing water conditions, and the process of bodyfeeding filter aids is the only technology that seals its own leaks. After sterilization, the filter aids can be recycled. With hydrocyclones the contaminants can be separated from the filter aids and up to 90% of the filter aid can be recovered. This makes filter aid treatment a very cost effective treatment for large plants as well as the smaller plants where this technology has been used in the past. Pressure leaf filters using filter aid precoat can be used in place of sand filters, after sand filters, on good water supplies directly without pretreatment, or to clean sand filter backwash.

20 Claims, 4 Drawing Sheets

APPARATUS FOR STEAM STERILIZING AND RECYCLING LEAF-FILTER AIDS

BACKGROUND OF THE INVENTION

1. Field of the Invention

The field of the invention is the filtration of water utilizing filter aids to improve the capture of turbid particles particularly biota including protozoa, the steam sterilization of the filter aids, and the recycling of the steam sterilized filter aids.

2. Description of the Prior Art

Filter aids improve filtration performance. Because many slurries filter slowly, blind the filter media, or do not easily release a clear filtrate, filter aids are used. These filter aids are fast filtering and when used as a precoat on a filter element or as a body feed during the filtration, they improve the poor filtering properties of the chosen slurry. The addition of these filter aids increases the cost of the filtration process and represents an increase in the amount of filter cake produced and in some cases the hauling and disposal of the cake. However, the improvement in the filtration of the slurry tends to outweigh the extra cost and problems of disposal.

The first filter aids probably were used in Germany about 1885 when diatomaceous earth, hereinafter referred to as "D.E.", (called "Kieselguhr" in German) was first used for clarifying beer. Today, almost all beer is still filtered through D.E. essentially as it was one-hundred-fourteen years ago. The filter aid supply business has grown to include many other materials besides D.E. and applications are in a very wide cross section of the filtration industry.

Diatomaceous earth is a useful filter aid because it has the following qualities. Diatomaceous earth comprises silica skeletons of one-celled diatom algae that live in all water systems. These skeletons have accumulated on the ocean floor and lake beds over millions of years. The beds of D.E. are mined and the D.E. is processed for use as a filter aid. By varying the amount of processing, the porosity of the D.E. is controlled. The grades of D.E. used in water treatment typically look like talcum powder. This grade of D.E. has a mean particle diameter of eighteen microns ($18\mu$) and a $D_{10}$ (smallest ten percent) of five microns ($5\mu$). This grade of D.E. has a mean pore diameter of seven microns ($7\mu$) and an effective pore diameter of one micron ($1\mu$). A cake made from this grade of D.E. has a cake permeability of 1.2 darcies.

Diatomaceous earth filters water better than sand. Compared to D.E., sand is a one-thousand times (1000×) larger particle. D.E. can filter by straining while sand cannot.

The effectiveness of a pathogenic filter is typically described logrythmically. A "three log kill" reduces the amount of pathogens to -log (-3) or 1/103 or 0.001; a "two log kill" reduces the amount of pathogens to -log (-2) or 1/103 or 0.01.

Starting in the early 1980's, researchers such as Gary Logsdon, Jim Symons, Kelly Lange, Bill Bellamy, and Dave Hendricks identified D.E. as an outstanding media for removing pathogens. In addition, Dr. Jerry Ongerth in 1977 conducted controlled experiments to measure just exactly how well D.E. filter aids remove cryptosporidium (a pathogen) from water. His work, using essentially a one-eighth inch (⅛") thick D.E. precoat, showed over six log (1/106) removal at one gallon per minute per square foot (1 gpm/ft$^2$) filtration rate and about seven log (1/107) removal at two gallons per minute per square foot (2 gpm/ft$^2$). If those experiments had continued to a full one inch (1") cake thickness, the removals might have improved to eight log (1/108) reduction. For a complete disclosure ofthe previously mentioned studies, seethe following articles: Gary S. Logsdon, et al., The role of Filtration in Preventing Waterborne Disease, JAWWA, Dec. (1982); Gary S. Logsdon et al., Alternative Filtration Methods for Reniovai of Giaidia Cylsts and Cyst Models, JAWWA, Feb. (1981); Kelly P. Lange et al., Filtration of Giardia Cysts and Other Substances, Volume 1: Diatomaceous Earth Filtration, USEPA Municipal Environmental Research Laboratory Project Summary, Sept. (1984); Jerry E. Ongerth et al., D.E. Filtration to Remove Cryptosporidium, JAWWA, Dec. (1997); George P. Fulton, et al., Ozone/DE Filtration Provides Optimized Treatment for New York City, Cioton Slipply, Public Works, July (1992); James A. Harp et al., Lifect of Pasteurization on Infilctiivity of Cyptosporidium Parvum O-cysts in Water and Milk, Applied And Environmental Microbiology 62, 8 (1996).

Diatomaceous earth can be treated to increase its performance as a filter aid. Adding five percent (5%) alum by weight to a D.E. precoat and body feed improves virus, bacteria, and fine turbidity removal.

A typical filter cake for water applications can be made through the following procedure. First, a filter is precoated at two-tenths of a pound per square foot (0.2 lbs/ft$^2$) to form a one-eight inch (⅛") cake. Next, unfiltered water having a 1.0 NTU turbidity having about five parts per million (5 ppm) filter aid added to it is passed through the filter. After a week of filtering, the filter cake will accumulate to a one inch (1") thickness.

During the past ten years the development of a wide spectrum of new lower cost, higher flux rate microfiltration membranes has replaced some of the filter aid market because of perceived advantages for membranes such as lower volume of solids to landfill, lower operating cost for labor and filter aid material, fewer problems with micro crystalline silica dust during feed slurry preparation, and smaller space requirements for membranes than filter aid systems.

The suppliers of filter aids have studied ways of recycling filter aids with the goal of reducing consumption for a specific application. Despite these efforts, virtually no operating systems for recycling filter aids exist. The reasons for the lack of installations are varied and compelling. All recovery processes suffer from complexity, high operating cost, higher than predicted losses of the filter aid, or a failure of the recycled filter aid to live up to the expectations of performance.

The general structure of a pressure leaf filter is disclosed in U.S. Pat. No. 4,968,423, issued to McKale, et al., on Nov. 6, 1990, titled, "Filter Leaf."

In U.S. Pat. No. 5,484,510, Hartman, et al., disclose a, "Water Distilling Apparatus." The apparatus condenses steam and then polishes it through a filter made with carbon. The steam is never used to purify the filter aid.

In U.S. Pat. No. 4,840,769, Nejigaki et al., disclose a, "Process for Sterilizing a Filtration Device." The filtration device being sterilized by Nejigaki is a hollow fiber type, semipermeable membrane filtration device. Nejigaki does not consider the sterilization of particle-type filter aids. Nor does Nejigaki contemplate the advantages of steam heating particle-type filter aids that are caked onto a filter so that the cake has uniform flow throughout.

In U.S. Pat. No. 4,310,422, Romey et al., disclose a, "Method of Processing and Recirculating Filtration Residues." Romey discloses a process wherein particle-type filter aids are dried and then removed from their filter; the dried material is then heated by inert gases in a location separate from the filter. The method disclosed by Romey will not penetrate and heat an already-removed, substantial thickness of filter aid particles without adding a fluidized bed that mixes the particles so that they all are eventually exposed to the hot inert gas.

In U.S. Pat. No. 1,831,433, Zoul, discloses a, "Process for the Removal of Solid Oils and Waxes from Liquid Oils and Similar Materials." Diatomaceous earth is used to filter and collect oils. The diatomaceous earth is removed from the filter and steamed to separate the collected oils from the D.E. Zoul does not consider the heating requirements necessary to sterilize D.E. Zoul does not contemplate the advantages of steaming D.E. in place on a filter.

In U.S. Pat. No. 5,466,417, Seki discloses a, "Sterilizer Using High Temperature Steam." Seki broadly claims the use of superheated steam for sterilization. Seki does not consider the requirements of sterilizing filter aids. Seki also does not consider the advantages of steam sterilizing filter aids in place and then recycling the filter aids.

The food, beverage, and drinking water markets utilize large quantities of filter aids. The use of recycled filtered aids might reduce the overall production costs. However, in these applications the living organisms collected in the filter aid during a filtering cycle need to be removed or destroyed before the filter aid can even be considered for recycle.

Another reason for developing filter aid sterilization and recycling is that, as the world population grows and consumption of the finite resources increases, the recycling of reusable resources will become mandatory. Filter aid consumption in the USA today exceeds five-hundred-million pounds per year (500,000,000 lbs/yr). Energy and labor are used to mine it, refine it, ship it, and dispose of it. Water filtration with D.E. and perlite filter aids is one of the easiest applications for reuse. The typical 1.0 specific gravity of organic contaminants captured on a precoat of D.E. ("sludge") easily separate from the 2.4 specific gravity D.E. particles in a classifying hydrocyclone. Fine inorganic contaminants collected in the D.E. are also easily separated from the large D.E. particles.

To assure that the recycled filter aids do not provide a second chance for captured pathogens to enter the water system, the filter aid must be sterilized before reuse. The D.E. recycle demonstration at the Jerome Park Reservoir in NYC used caustic soda to sterilize the filter aid, but that created wastewater and required 4 stages of hydrocyclones to flush out the dirt and caustic soda.

In U.S. Pat. No. 3,831,746, Wilson discloses, "Recovering Filter Aid Particles from Filter Cake." Wilson discloses the use of hydrocyclones to separate filter aids from the "slime" gathered on the filer aid during filtration. Wilson includes an in depth disclosure on the workings of hydrocyclones. This information is to be expressly incorporated in this disclosure.

Previously, a system for recovering filter aids using a rinsing of the filter aid with sodium hydroxide, followed by several stages of countercurrent washing with fresh water, followed by hydrocycloning was disclosed. This process was commercially installed on a few industrial applications but the volume of waste water and the neutralization requirements for the spent alkaline wastewater proved too complex and expensive.

In the field of municipal water filtration, the city of New York installed a three million gallon per day (3 mgd) pilot demonstration plant to recover D.E. filter aid at the Jerome Park Reservoir during the early 1990's using the Apcell sodium-hydroxide process and ran the plant for several years. The plant consistently recovered between eighty and ninety percent (80–90%) of the D.E. and reused it as bodyfeed for the subsequent filtration runs. The most effective operating range for separating contaminants was between 500 and 3000 g's centrifugal force in the hydrocyclone. The specific g-force that will recover the most filter aid without recovering too many fines or contaminants can be determined at each site. Recovery of too many broken pieces of filter aid particles would lower the mean particle diameter and change important filtering properties such as pressure drop across the bed. The violent collisions between particles are necessary to separate contaminants from the filter aid, but this also creates new fines that must be removed from the recovered inventory before reuse.

The EPA has identified recycled backwash water as a target for upgraded treatment. Many areas in the United States have inadequate supplies of good quality fresh water to meet growing demands. Recycling sand filter backwash recovers 3–5% of the total inlet supply that would otherwise be wasted. This backwash water contains high concentrations of pathogens and turbidity that is flushed out of the sand filters.

However, all of the known filter aid recycle processes require the use of chemicals, which increases the risk to the environment and the cost to the recycler. Therefore, the need exists for a filtering recycling process which does not give off toxic by-products yet which is efficient and relatively inexpensive. The instant invention accomplishes that objective.

SUMMARY OF INVENTION

The invention is a method and apparatus for steam sterilizing and recycling filter aids caked on filters at the end of the filtration cycle.

This steaming of the cake kills all the living bacteria, viruses, algae, and protozoa, including giardia and cryptosporidium o-cysts in minutes. Steam enters the filter vessel after the inlet feedwater has been purged with an air blow. The only equipment required is a steam supply and control valves operated from temperature sensors placed strategically in the filter and outlet piping.

Heating filter aid cakes to disinfect them for recycle simplifies the recovery process while producing no alkaline wastewater to handle. Instead of four stages of countercurrent washing and hydrocyclones, as in the alkaline Apcell process, steaming can achieve the desired separation of filter aid from the collected dirt in one or at most two stages of hydrocyclones.

The invention can be adapted to any type of filter that employs a filter aid. Examples of the type of filters that are included are pressure leaf filters, filter presses, tube filters, vacuum leaf filters, horizontal vacuum belt filters, rotary vacuum drum filters, disc filters, multiple tube candle filters, and Larox type indexing horizontal pressure filter presses. These type of filters are well known by those skilled in the art.

The general concept of heating of filter aids with a heat sterilization medium can be adapted to a more specific application of steaming of a pressure leaf filter. In a pressure leaf filter, at the end of a filter cycle, the water in the filter can be purged with air, and a steam valve would be opened to pressurize the filter tank. The pressurized steam penetrates the porous filter aid cake and quickly heats the filter cake. Also, the steam sterilizes the rest of the tank internals. The steam raises the temperature of even the innermost reaches of the cake. By raising the temperature of the filter cake to the sterilization temperature, for example one-hundred sixty degrees Fahrenheit (160° F.), for even two minutes, assures the 12 log kills found in food pasteurization. The result is that the original food grade filter aid would be restored to food grade biological standards by steaming after a full cycle of filtration.

The key to the thorough and quick heating of the cake is that the air purge of the water is immediately followed by steam pressurization, which continues to hold the filter cake in place on the filter screen. If the pressure is lost inside the filter tank, the filter cake can fall off the screens. An attempt to repressurized with steam would result in a "short-circuit" with very high velocity steam blowing uselessly through the holes in the cake to the filter outlet manifold, with poor heating of the remaining cake. Also, the filter cake cannot be allowed to dry because drying can create cracks in the filter cake that allow steam to pass without heating the cake throughout.

Steaming is a very sure, simple, fast and inexpensive way to kill the tough protozoa such as cryptosporidium which would not be easily killed with alkaline or oxidizing solutions. The crypto o-cysts have a tough outer shell that resists chlorine, caustic, and ultra-violet disinfections and was the cause of the 1993 outbreak in Milwaukee, Wis., that sickened 400,000 people and killed 112.

D.E. could be a major tool for achieving the EPA goals for crypto removal from drinking water. The reason for this is that filter aids such as D.E. are perfectly sized to trap the crypto o-ocyts. Diatomaceous earth is a candidate to remove pathogens such as $E$-$coli$, Giardia, cryptosporidium, and other biota that are one micron $(1\mu)$ or larger from drinking water. The present invention will make the re-use of filter aids such as D.E. safer and surer than any other sterilization currently in use.

D.E. and most perlite and other inorganic filter aids are all stable to one-thousand degrees Fahrenheit (1000° F.) so treatment with a heat sterilizing medium does not effect the recycled material's performance. Also, because D.E. is almost pure silica, D.E. is only slightly soluble in water, even at boiling temperatures. Therefore, steaming of D.E. does not add impurities to the water during steaming or in the subsequent cycle. Some pressure leaf filters have been made to withstand temperatures to four-hundred-fifty degrees Fahrenheit (450° F.), so steaming to perhaps two-hundred-fifty degrees Fahrenheit (250° F.) would not affect the filter.

Since the "dirt" load is low in many waters, the amount of D.E. used can be very low, making D.E. very economical. However, in large or medium size plants, such as those which handle ten to fifty million gallons per day (10–50 MGD), plants with high turbidities, e.g. five to ten Neflobetic Turbidity Units (5–10 NTU), the D.E. needed represents a large cost and a disposal problem.

A key element of the current EPA standard is the requirement to install filtration equipment to insure at least two log ($\frac{1}{10}^2$) removal of cryptosporidium o-cysts. This regulation evolved out of the recognition that large pathogens such as giardia, cryptosporidium, and legionella are resistant to normal chlorine disinfection residuals and contact times.

In accordance with these and other objects which will become apparent hereinafter, the instant invention will now be described with particular reference to the accompanying drawings.

DETAILED DESCRIPTION OF THE PREFERRED EMBODIMENTS

The invention encompasses a method of sterilizing filter aids with steam while the filter aids are still caked in place on the leaves of a pressure leaf filter. The invention also includes a method of recycling the sterilized filter aid and an apparatus for steam sterilization and recycling.

The preferred embodiment of the apparatus for steam sterilizing and recycling filter aid is similar to a pressure leaf filter but includes additional elements to supply steam and reclaim the filter aid. In addition to pressure leaf filters, the invention can be adapted to other customary filters such as filter presses, tube filters, vacuum leaf filters, horizontal vacuum belt filters, rotary vacuum drum filters, disc filters, multiple tube candle filters, and Larox type indexing horizontal pressure filter presses.

Figure 1:
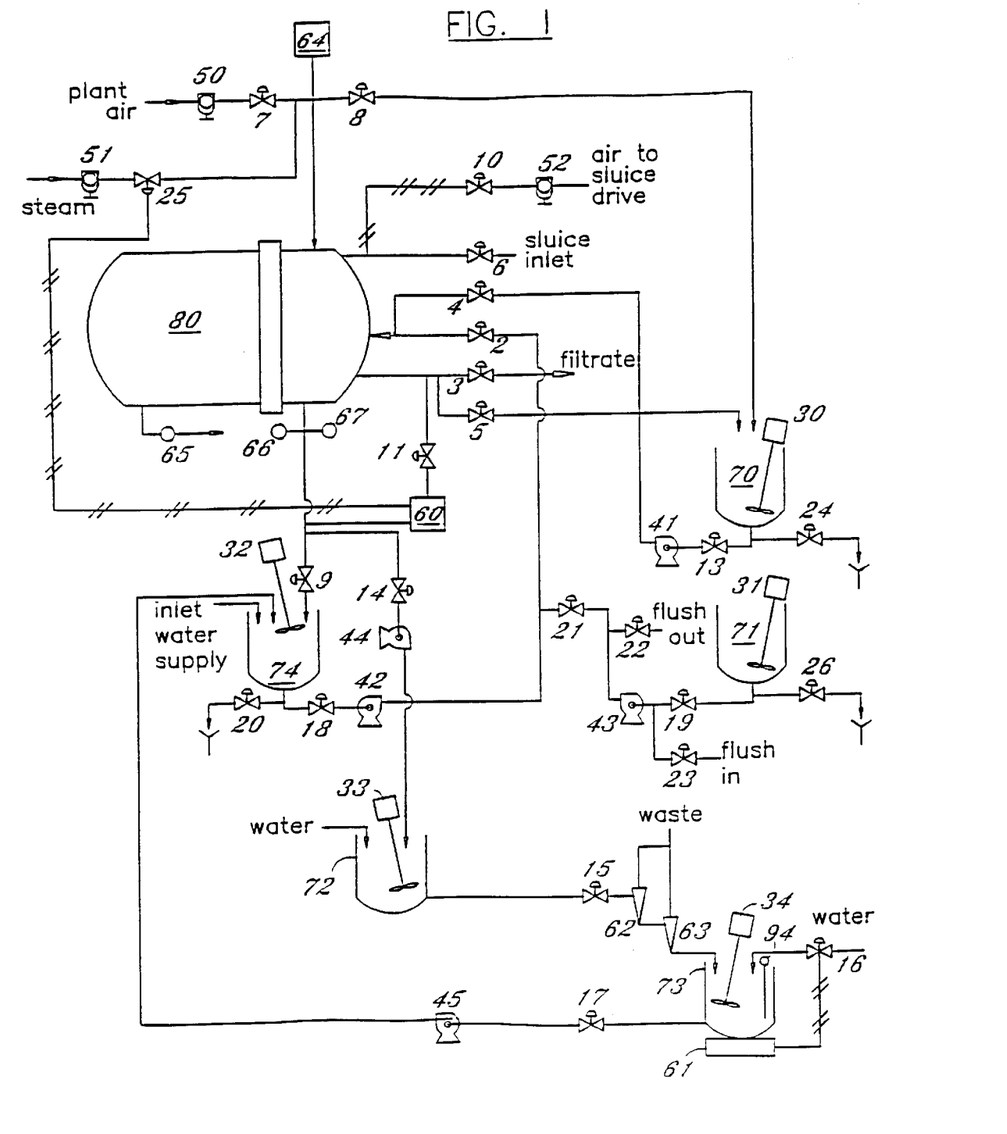
FIG. 1 is a schematic view of an apparatus for steam sterilization and recycling of a filter aid.
Figure 2:
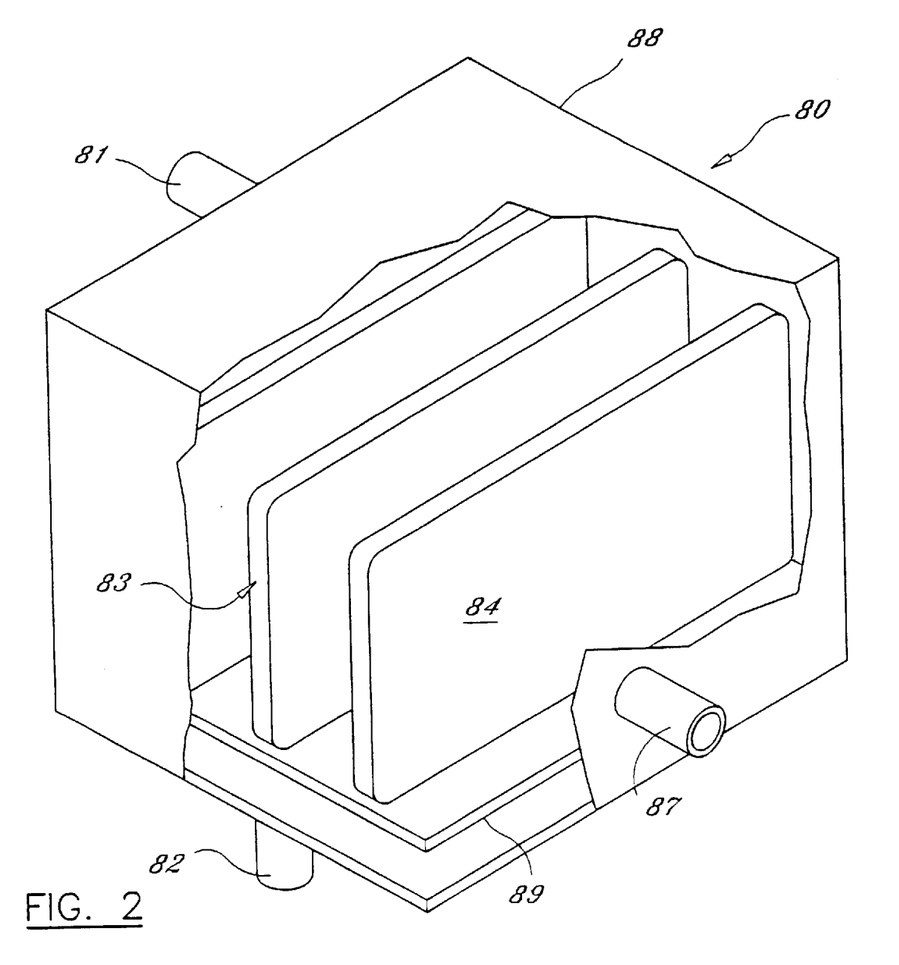
FIG. 2 is a partial cutaway, perspective view of a pressure leaf filter.
Figure 3:
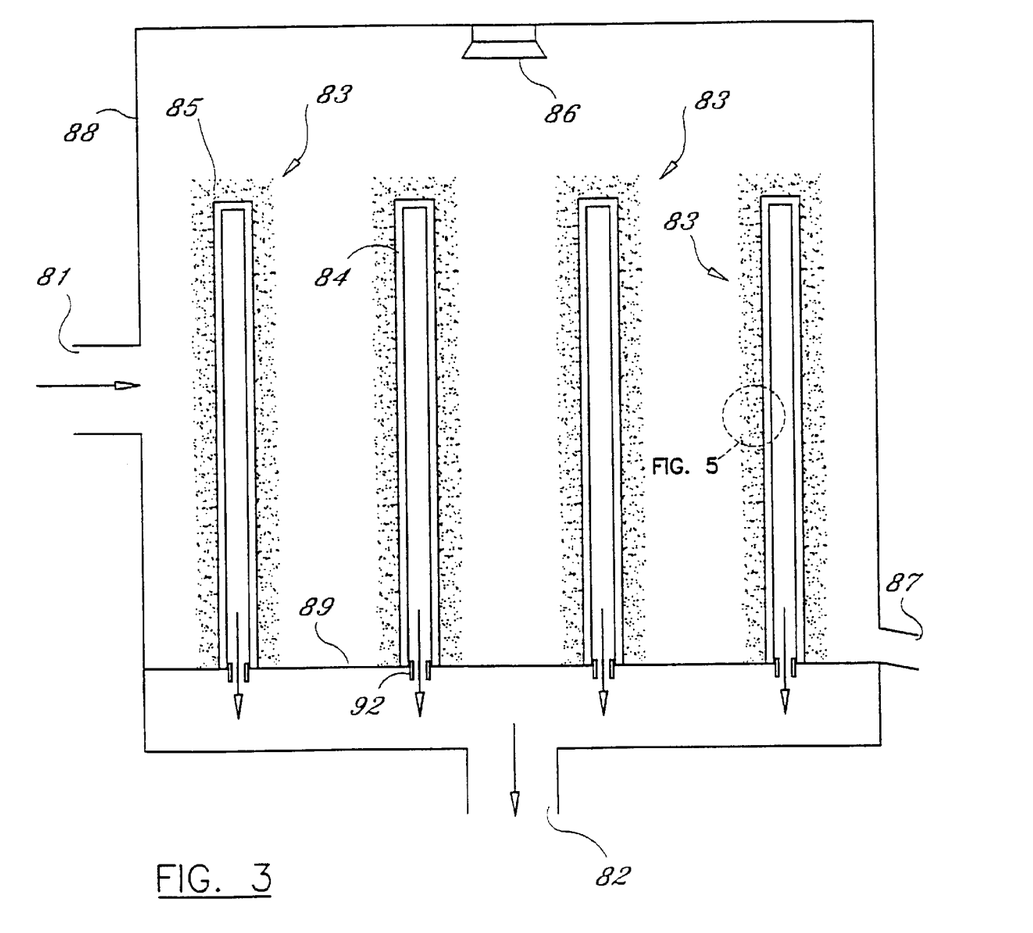
FIG. 3 is a side, cross-section view of the pressure leaf filter having filter cakes surrounding each leaf.

As shown in FIG. 1, the pressure leaf filter portion of the apparatus comprises filter 80. As shown in FIG. 2, filter 80 is built around vessel 88. Vessel 88 is generally air and water-tight, and is able to withstand any operating pressures safely. Exceptions include filter inlet 81 and filter outlet 82 that are located on opposing sides of manifold 89, and sluice inlet 86 and sluice drain 87. Inside vessel 88, manifold 89 is horizontal and divides vessel 88 internally into two sides. Manifold 89 contains a plurality of holes (not shown).

Leaves 83 are hollow, essentially rectangular, flat surfaces called septums 84. Septums 84 are generally porous and allow the filtrate to pass through easily while not allowing the filter aid to pass through. As stated, leaves 83 are hollow. Leaves 83 each have connector 92 that provides an opening to the cavity within leaf 83. Connector 92 plugs into a hole in manifold 89. The number of leaves equals the number of holes in the manifold. All of leaves 83 are located on one side of manifold 89. This arrangement of filter 80 provides a path wherein any filtrate that enters filter 80 through filter inlet 81, passes through septum 84 into the cavities within leaves 84, through connector 92, across manifold 89, to the other side of vessel 88, and out filter outlet 82.

Figure 5:
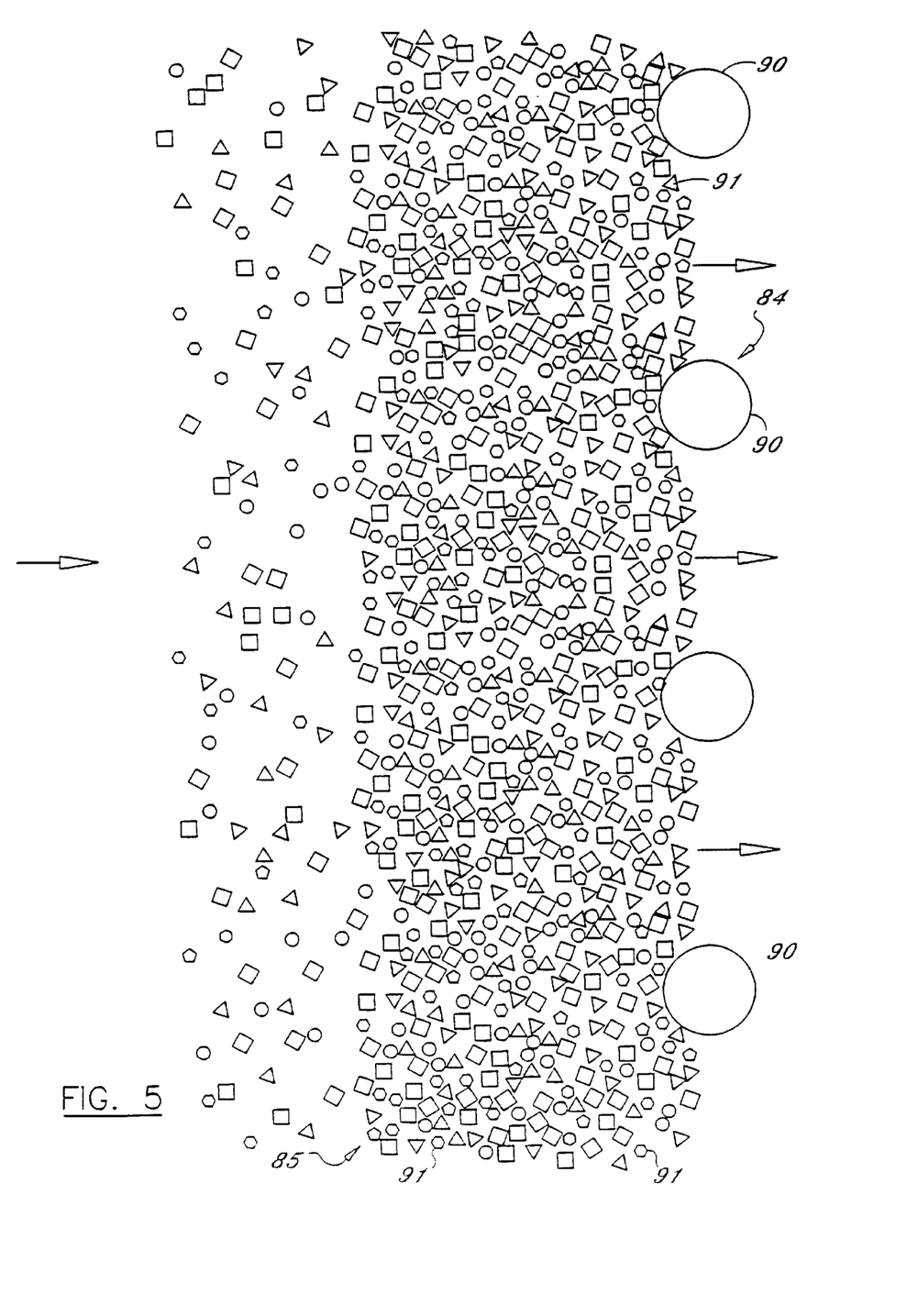
FIG. 5 is a stylized, close up view of a filter cake lying on a septum. Elements of this figure are drawn out of proportion with regard to each other in order to demonstrate the invention. In particular, the filter cake would be thicker relative to the fibers of the septum.

The filter aid is added to leaves 83 by passing a slurry of filter aid particles 91 (see FIG. 5) across septum 84. Septum 84 is generally made of interwoven fibers 90. Preferably, septum 84 is constructed of woven wire screen or fabric. As shown in FIG. 5, particles 91 do not pass fibers 90 of septum 84. As particles 91 accumulate on fibers 90, filter cake 85 begins to form on the surface of septum 84. Filter cake 85 has uniform flow properties, meaning filtrate passes through all areas of filter cake 85 at an equal rate. These uniform flow properties are created because if an area does have a greater flow rate, more filter aid will pass through that location. And, as filter aid accumulates in that location, thereby plugging flow, and causing flow throughout filter cake 84 again to reach uniformity.

The following are possible types of filter aid that are included in the invention: diatomaceous earth, perlite, cellulose, amorphous silica from rice hull ash, and specialty manufactured micro beads (which precipitate heavy metals as well as remove suspended solids), could be used as precoat and bodyfeed filter aids. The invention can be applied to filters that use only precoat such as rotary vacuum drum filters which shave off 0.001" or so with a knife on each revolution of the drum.

Filter cake 85 removes turbid particles or "sludge" as liquid passes through filter 80. As material is removed from the filtrate, filter cake 85 becomes fouled. To extend the length of time and volume of filtrate that can be filtered, body feed of particles 91 of filter aid can be added to the unfiltered liquid before the liquid is filtered. A body feed extends the filtration by providing clean, unfouled particles that add to the outer surface of filter cake 85 and continue the filtration. A body feed causes filter cake 85 to thicken throughout filtration. Even with a body feed, filter cake 85 ultimately becomes filled with sludge including trapped biota. Once fouled, filter cake 85 must be replaced.

To create filter cake 85, a precoat of filter aid is introduced to filter 80. As shown in FIG. 1, precoat tank 70 is where a suspension of filter aid is prepared for addition to filter 80. Preferably, the filter aid used in the precoat is new; this new filter aid is referred to as "virgin filter aid." Filter aid and water are mixed in precoat tank 70 with agitator 30. When the suspension has a proper consistency, as characterized by specific gravity, the suspension is moved from precoat tank 70 to the filter inlet 81 of filter 80 by pump 41. For the precoat suspension to move, valves 13, 4 and 5 must be open. The precoat is preferably added to filter 80 when leaves 83 are clean. After a sufficient thickness of precoat has accumulated on leaves 83, pump 41 can be stopped and valves 13, 4 and 5 closed.

Feed tank 74 is attached to the filter inlet 81 of filter 80 thereby providing a means to introduce the liquid to be filtered for batch processing. Impure, unfiltered water is added to feed tank 74. Small amounts of filter aid are mixed in feed tank 74 with the liquid by agitator 32. Body feed is moved from feed tank 74 to filter 80 by opening valves 18 and 2 and turning on pump 42. Body feed can be continuously prepared in feed tank 74 by monitoring the specific gravity contained therein and adjusting the amount of liquid and filter aid. As liquid passes through filter cake 85, clean filtrate is produced. A valve 3 connects to filter outlet 82. By opening valve 3 during filtration, clean filtrate is collected.

FIG. 1 also shows an optional body feed system wherein filter aid is not added to the feed tank 74 as part of a batch process, but is metered into a continuous flow of body feed, via valve 21. A feed tank 71 is used to mix the filter aid with water to form a slurry, and pump 43 pumps this slurry through valve 21. Valve 19 controls the slurry feed to pump 43.

Steam is fed through filter 80 to sterilize the filter aid contained in filter cake 85. When filter aid becomes fouled (or any time earlier), filter cake 85 can be sterilized by adding steam. Before steaming is started, the body feed should be stopped by closing valves 2 and 18. To drain any water contained in vessel 88, valve 9 is opened and pressurized steam from a steam regulator 51 or plant air from a plant air regulator 50 is forced into filter 80 through sluice inlet 86. Water is thereby pressed out. This pressurized air or steam can be used to empty filter 80. However, while air has the advantage of being cheaper, air must not be passed through filter cake 85 or else filter cake 85 may dry and crack. Once filter 80 is empty, steam can be pumped into filter 80 by opening valve 25 (if not already open).

Preferably, wet steam is used because wet steam will not dry filter cake 85 and wet steam has a higher heat capacity than dry steam. Valve 11, which connects to the filter outlet 82 of filter 80, is opened during steam flow to create a flow through filter 80. As steam passes through filter cake 85, filter cake 85 and any water contained therein heats. Because filter cake 85 has a uniform flow (see above), steam penetrates filter cake 85 uniformly. The temperature of filter cake 85 can be measured indirectly by measuring the temperature of the effluent (hereinafter, "effluent temperature") with temperature sensor 60. Experiments have shown that an effluent having a temperature of one-hundred-forty degrees Fahrenheit (140° F.) corresponds to a temperature in filter cake 85 of one-hundred-sixty degrees Fahrenheit (160° F.) that sterilizes filter cake 85 (as well as any other contents in filter 80). In a preferred embodiment, temperature sensor 60 controls valve 25 and causes valve 25 to close once filter cake 85 has been sufficiently heated. When heating filter cake 85, a target temperature is used; a target temperature is a temperature to which something is to be heated.

Other means to measure the completeness of the sterilization can be included in the invention. First, a timer calibrated with the customary time needed can be used to stop flow of the heat sterilizing medium after filter cake 85 has been heated. Another preferred embodiment is to move temperature sensor 60 to the inside of filter leaf 83 near connector 92. Another means of detecting when filter 85 has been sterilized is to add a pressure sensor in the upstream side of the cake which shows a decrease when all the extra water has been evacuated from the pores. Another embodiment measures the rate of steam flow into the vessel to detect when steam flow increases because the water in filter cake 85 has been displaced.

After steaming, the sterilized filter cake 85 can be recycled. First, to remove filter cake 85 from leaves 83, water is fed into filter 80 through sluice inlet 86 by opening a sluice inlet valve 6 and an air-to-sluice drive valve 10; and by powering an air-to-sluice drive pump 52. Sluice inlet 82 acts like a sprinkler and rinses filter cake 85 off leaves 83. The rinsed filter cake exits filter 80 through sluice drain 87. Valve 9 is closed, valve 14 is opened and pump 44 is activated to move the rinsed filter cake from filter 80 to recovery tank 72. In recovery tank 72, the sterilized filter cake is diluted with water and mixed by agitator 33. The force of pump 44 and agitator 33 loosen much of the now sterilized sludge that was trapped by the filter aid.

The next step in recycling is hydrocloning. Hydrocloning separates sludge that has been trapped on filter aid. By opening valve 15, the diluted sterilized filter aid travels from recovery tank 72 to hydrocyclone 62. Hydrocyclone 62 separates filter aid from sludge having a different specific gravity. Sludge and fine particles spin out of hydrocyclone for disposal. Filter aid moves to a second hydrocyclone 63. While not necessary, the inclusion of a second hydrocyclone separates more sludge from filter aid. From hydrocyclone 63, the recycled filter aid moves to dilution tank 73. In dilution tank 73, level meter 94 works in conjunction with scale 61 to dilute the recycled filter aid slurry to a usable concentration. The recycled filter aid slurry is pumped from dilution tank 73 to feed tank 74 by opening valve 17 and activating pump 45. Or, if feed tank 71 is in use, the recycled filter aid slurry is pumped from dilution tank 73 to feed tank 71 by connecting the output of pump 45 to feed tank 71. While not preferred, the invention includes other traditional methods of separating solids suspended in a liquid, including centrifugation.

Preferably recycled filter aid is only pumped to feed tank 74 (or feed tank 71) and not precoat tank 70, because the precoat preferably contains "virgin", unrecycled filter aid.

In the method of sterilization disclosed herein, a heat sterilizing medium, preferably steam, is used to heat the cake to at least one-hundred-sixty degrees Fahrenheit (160° F) for at least two minutes to kill all the collected pathogens in the cake.

As previously described, FIG. 5 depicts filter cake 85 comprising particles 91 that have accumulated on support 84 throughout filtering. During the entire filtration cycle, the body feed of filter aid is flowing to the areas of the cake with the least flow resistance. This is an automatic mechanism, like water seeking its own level, which ensures that all parts of the cake have the same filtration resistance. During steam sterilization, the steam is uniformly distributed through uniformly-distributed cake 85 just like the water. As a result, all parts of filter cake 85 heat up at the same rate, so that breakthrough of live steam through the support septum occurs nearly uniformly at all points. When the temperature inside the filtrate manifold exceeds one-hundred-sixty degrees Fahrenheit (160° F.), all parts of the cake are sterilized. No cold dead spots that did not receive steam remain.

Although wet steam (steam at the boiling point) is the preferred heat sterilizing medium, the invention can employ other heat sterilizing medium such as superheated steam, hot air, and hot water.

1) Procedure for Testing the Steam Sterilization Efficiency

A procedure for testing the steam sterilization efficiency was developed. For the tests, a benign strain of *E-coli* bacteria that has the same temperature sensitivity as the cryptosporidium and giardia o-cysts was used. The *E-coli* are typically about one-and-one-tenth to one-and-one-half microns ($1.1–1.5\mu$) wide by two to six microns ($2–6\mu$) long. *E-coli* are easily cultivated to very high broth strength, safe, and easily detected and identified as viable or non-viable. For these reasons, *E-coli* was chosen for the tests.

The test procedure was to be as follows:

A) Forming a one-eighth inch (⅛") thick virgin D.E. precoat on filter septum 84 at the same one gallon per minuter per square foot (1 gpm/ft²) flow rate as the filtering cycle. Approximately ten (10) minutes elapsed time was required until filtrate clarity met the specified 1 NTU water quality.

B) Injecting a blend of D.E. body feed, bentonite clay (to simulate turbidity in a raw water), and *E-coli* broth at the same one gallon per minute per square foot (1 gpm/ft²) filtration rate as the precoating operation. The normal two to four week cycle in a water plant to build up a full one inch (1") cake was compressed to thirty (30) minutes by injecting the body feed blend into the filter at a one thousand times higher concentration than normal.

C) Draining the water out of the filter tank under air pressure after the one inch (1") cake is formed with 8 log *E-coli* per milliliter distributed uniformly throughout, to keep the D.E. cake in place on the filter septums 84.

D) Opening filter 80 and collecting core samples of the filter cake for *E-coli* testing.

E) Closing the filter and opening a steam valve to pressurize the filter tank to twenty pounds per square inch (20 psi) with the filtrate outlet valve open.

F) Closing the steam valve when the filtrate outlet manifold temperature reaches one-hundred-sixty degrees Fahrenheit (160° F.). This step took two to three minutes.

G) Opening immediately the filter and collecting core samples of the cakes for *E-coli* testing.

H) Packing them in ice to stop further sterilization.

I) Repeating steps A–H above for different steaming times, cake thicknesses, filtration rates, and bentonite dosages to measure effects on sterilization.

2) Sterilization Test Apparatus

Figure 4:
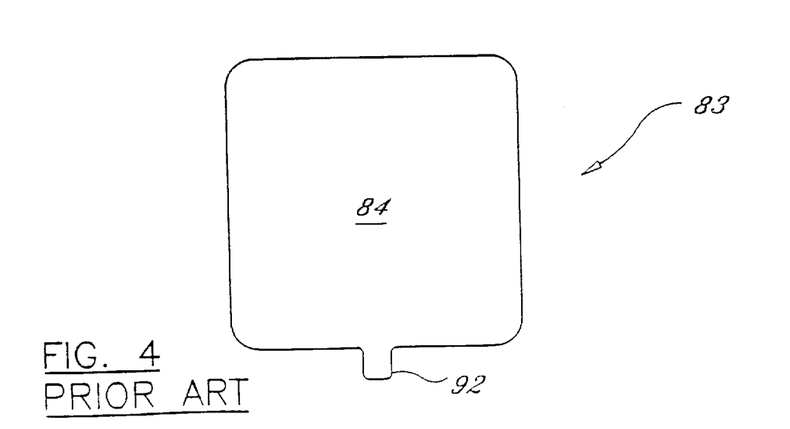
FIG. 4 is a front view of a prior art leaf used in the pressure leaf filter.

FIGS. 1, 2, and 4 show the filter apparatus, a standard skid mounted pilot unit manufactured by the Angola, N.Y. Filtration Systems Division of Aqua Care Systems, Inc., which includes the following items:

A) Pressure filter 80 with leaves 83 made with plain Dutch twill septums 84;

B) Precoat tank 70;

C) Centrifugal precoat pump 41 with control panel;

D) Interconnecting piping, gages, and valving for a functional pilot plant to recirculate precoat, control feed rate, introduce air and steam, and produce the desired simulation of filter operation.

The following materials were used in the testing:

A) House water, air, electricity, and steam supply;

B) *E-coli* broth at 10 log cfu/ml;

C) Tank 74 for blending body feed D.E. with bentonite clay, and *E-coli*;

D) Metering pump 42 for transferring admix slurry to the precoat tank (via the filter 80) at measured rates;

E) Pilot plant and lab facilities for conducting the tests and analyzing the samples.

Various grades of D.E. and KWK bentonite clay were used in the tests. Grades of filter aids which are tighter or more open to suit the specific objectives for each plant can be used.

3) Detailed Test Procedure Sequence

A) Close filter valve 3, filter drain 11, and filtrate outlet valve 5, but leave the air vent valve 8 open;

B) Mix and maintain in suspension dry D.E. in the precoat tank 70 which is filled with city water;

C) Start precoat pump 41, and fill filter 80 from precoat tank 41 until filter 80 overflows from air vent 8 back to precoat tank 70;

D) Open filtrate valve 5 and close air vent 8 and continue recirculating filtrate back to precoat tank 70 until the turbidity of the filtrate is below 1 NTU. This normally takes about ten minutes;

E) Add D.E. to bodyfeed tank 74, along with bentonite clay, and *E-coli* broth. Mix well and maintain suspension;

F) Continue precoat pump 41 recirculation through filter 80 and back to precoat tank 70. Meter bodyfeed tank 74 contents into precoat tank 70 over 30 minutes by starting pump 42;

G) Adjust the bypass valve 29 at the precoat pump discharge to maintain the desired flow rate to the filter as the body feed grows the cake and the backpressure cake resistance grows to 50 psi;

H) Open air supply valve 7 to filter 80 and shut off precoat recirculation pump 41, to push the water out of filter 80;

I) Open the heel drain 9, in order to drain the rest of the water;

J) Close air valve 7 and open filter 80 when the pressure drops back to atmospheric. Collect core samples for lab tests for *E-coli*;

K) Close filter 80 and open steam valve 25 with the filtrate outlet manifold 11 open and the filter drain valve 9 closed;

L) Close the steam valve 25 when the temperature gage 60 on the filtrate outlet manifold reaches the desired set point (such as 160° degrees F.) for the test. This is likely less than three minutes for a one inch thick filter cake;

K) Quickly open the filter drain 9 and vent valves (not shown) to drop the pressure to atmospheric and open filter 80 to collect coring samples of the sterilized cakes. Put the coring samples in plastic bags and pack the samples in ice immediately, to stop any further sterilization by the heated cake.

4) Sterilization Test Results

A) All tests formed at least a one inch (1") cake before termination of the test at fifty pounds per square inch (50 psi) pressure differential across the cake. Bodyfeed to build the one inch (1") cake was typically completed in about thirty minutes.

B) All cake samples collected before steaming showed the cakes to be uniformly contaminated with 7–8 log viable *E-coli* cfu's/ml cake.

C) All cake samples collected after every steaming showed 100% kill. No part of any cake was ever incompletely sterilized in the tests.

D) Steam consumption was not measured in the tests but at least 50% was consumed heating the metal pilot filter. In a full size installation, the ratio of filter surface to tank weight would be more efficient. The heat consumed by the tank might then be less than 25% of the total. From simple calculations based on the low 0.2 specific heat of the filter aid and the 1.0 specific heat of the water it could be estimated how much steam would be required to sterilize the D.E. cake. Because the filter aid is such a poor conductor of heat the, theoretical demand would be more than the actual. Theoretical steam demand could be as high as 180 BTU's per pound of D.E. which would translate to $0.90/1000 pounds of filter aid sterilized assuming two million dollar BTU fuel cost and forty percent (40%) boiler efficiency for producing steam.

5) Discussion and Conclusions About the Sterilization Tests

Cryptosporidium and giardia can be 100% killed at onehundred sixty degrees Fahrenheit (160° F.) in twenty seconds. The test apparatus prevented us from restricting the exposure to 20 seconds because of the time required to open the filter, extract a sample of cake, and chill it down with ice. Therefore, we did not identify the true minimum steaming time, temperature, and steam dose required for sterilization.

However, because of certain fortuitous circumstances inherent to steaming the filter aid cake, the process is extremely fast, efficient, and cheap. Specifically:

A) Filter aids are actually good insulators that conduct heat poorly, so the steam can race through the original filtrate channels heating and killing pathogens before the pore walls are uniformly heated.

B) Because of the uniformity of filter aid cake, steam penetrates evenly in all areas to assure complete sterilization. There were no cold spots in the cakes even when double the normal cake thickness was used. On one test we purposely loaded double the maximum body feed cake on the leaves. This filled the space between the leaves, which left no short distance access for the steam to reach the centers of the cakes. Despite these 3 inch thick bridged cakes, the open filtrate pores in the cake still allowed steam to penetrate very quickly from the perimeter of the leaf area all the way to the center of the leaves, a distance of eight inches (8") from the perimeter. When temperatures in the filtrate outlet manifold reach the 160 degrees F goal, all parts of the cake are 100% sterilized.

C) Steam heats the water in the cake pores, which lowers the viscosity and surface tension. This in turn allows the low steam and air pressure to push out much of this pore water. The result is that filter cakes after steaming can be over 50% solids instead of 35% solids for unheated cakes. With less water remaining in the pores, less heat is required to reach sterilization temperature.

This method for sterilization demonstrated the very quick heating of the entire filter cake 85. This translates into low steam use, and negligible increase in the cycle time. The cause of the fast heating is believed to be that the existing pores in filter cake 85 (from the water filtration step), are still all functional in the sterilization step. Septum 84 at atmospheric pressure provides the basis for a differential pressure that allows the steam to travel very quickly to all parts of the cake, pushing out air or water that is in the pores. If the filter aid were in a pile on a flat floor and no differential pressure existed across the pile, the medium would not be able to push out air or water so the heating would occur by condensation of the steam which would make room for more steam behind it. The cake would have a temperature gradient and would take much longer to heat throughout. Again, this differential pressure needed for the method of sterilization is created when filter cake 85 is sterilized with a heated medium in-place.

Another positive factor that leads to improved efficiency is the low specific heat and general insulating properties of filter aids. The heated medium is able to act quickly on the collected pathogens in the pores of the cake in part because not a lot of heated medium is wasted on heating the filter aid. Extra water from condensate would tend to at least temporarily plug the pores, thereby preventing quick passage of heated medium through filter cake 85.

Because the differential pressure pushes water out of the pores ahead of the moving wave front of heated medium, heated medium is not consumed in heating all of this water. As evidence of this mechanism, the cakes after low pressure steaming were fifty percent (50%) solids instead of thirtyfive percent (35%) solids without heating.

In a full-scale plant operation, filter cake 85 would be sluiced off the leaves after steaming, which would cool it down to ambient temperature. There would be no trace of the steaming process and no wastewater produced from the steaming. The steaming process would only add an insignificant two to three (2–3) minutes to the overall cycle time.

Steaming the cake in place on the leaves is a process that lends itself to very simple automation. The PLC controlling the filtration process would open and close the steam valve at the proper point in the cycle. The steam shut off could be initiated on time or on outlet manifold temperature.

Removing Collected Solids from Filter Aids

After sterilization with filter aid material 85 in place on filter leaves 83, the cakes 85 can be sluiced off leaves 83 with water sprays 86 and drained to a stirred storage tank 72 as a slurry. Collected particles 91, including the dead pathogens removed from the voids of filter aid cake 83, are easily released back into the water as the cake is sluiced off the leaves 83. In slurry storage tank 72, mixer 33 provides multiple collisions and high Reynolds number shear to separate remaining adherent particles from the filter aid particles 91.

Some collected particles may be lodged tightly in the micropores internal to filter aid particles 91. Sluicing and mixer shear may not be enough to dislodge these particles but the violent shear and pressure changes that occur as the slurry passes through a high speed centrifugal pump on the way to the hydrocyclone 62 separator will release even the most resistant contaminants. As a final process the high velocity entry to hydrocyclone 62 provides additional violent shear, collisions and pressure drop to release contaminants.

Because a single hydrocyclone may not give as much cleaning and separation as desired, second stage hydrocyclone 63 can be added where eighty percent (80%) of the remaining fines and contaminants will be removed.

Contaminants and filter aid fines removed from the slurry in the hydrocyclone overflow stream should be directed to a small impoundment where the particles can settle out. The supernatant can be decanted off to waste treatment. The solids can be left in the impoundment to thicken and subsequent batches added on top until there is sufficient inventory to justify removal for disposal. Because the collected contaminants contain a significant amount of filter aid fines, the sludge will drain quickly and could be a good soil conditioner for farming.

Re-using Recovered Filter Aids

Steam sterilization destroys pathogens collected in the filter aid cake. The dead pathogens and other contaminants removed from the water cannot be totally removed from the filter aid particles. However, contaminates that remain in the particles even after violent shear and collisions of the sluicing, mixing, pumping and hydrocycloning recovery steps, will remain in the particles during subsequent filtering. This is an order of magnitude safer than backwashing a sand filter and re-using the sand.

The particle size distribution (psd) for the recovered filter aid is determined by the pressure and design of the hydrocyclones. In some cases the most efficient operation would be to buy a coarse grade of filter aid and let the natural attrition of the particles reduce the subsequent psd of recycled filter aid to the desired range. This would allow the hydrocyclones to be designed to achieve the maximum recovery of filter aid. However, a finer grade of filter aid may be used, in key case a higher percentage of fines is discarded during recycle in order to purge the highest proportion of contaminants on each cycle. In this latter case, the filter aid losses will be higher but the recovered filter aid will be cleaner.

The preferred operating strategy for filter aid recycling is to use the recovered filter aid for body feed and use fresh virgin filter aid for the precoat. The recovered hydrocyclone underflow filter aid slurry would be delivered to a batch storage tank. The density would be measured and dilution water would be added to produce a required concentration for reuse. The corrected density slurry of recovered filter aid would be transferred to the bodyfeed metering tank on demand from level switches in the bodyfeed tank.

Practical Drinking Water Applications for Filter Aid Treatment

A) Following Conventional Coagulation, Clarification, and Sand Filters

Second stage filtration with D.E. and perlite filter aids would be an efficient and cost effective upgrade to sand filter installations. There are many sand filter installations where the current flow demand is close to the practical maximum. Sand filters even under the best conditions are not very effective for pathogens such as cryptosporidium unless the pathogens are properly coagulated and encapsulated in a large floc particle. Without good pre-coagulation, rapid sand filters would be as effective as using "chicken wire" for your window screens. The average D.E. particle is 1000 times smaller than the average sand particle. D.E. filtration even at four gallons per minute per square foot (4 gpm/ft$^2$) would assure at least 6 log removal of cryptosporidium and giardia and since the sand filter would remove the bulk of the influent turbidity the usage rate of D.E. would be very low. Filtrate from the D.E. bed would easily surpass all the current requirements for turbidity and pathogens. The use of second stage D.E. filtration would even permit the upgrade of the sand filter to a higher flow rate with dual granular media.

B) Replacing Rapid Sand Filters Following Coagulation and Clarification.

D.E. and perlite filter aids can replace sand filters following clarification. Because there is the possibility for clarifier upsets, the D.E. usage could at times be high but the water quality would still be excellent even during such upsets.

C) Direct Filtration Without Coagulation

When the raw water quality is consistently below 10 NTU turbidity, direct filtration on pressure leaf filters has been an excellent process for drinking water. Most of the D.E. water systems operating in the USA are direct filtration. This process has some very attractive benefits:

1) No complicated chemical feed is required. This is especially attractive for small plants where a chemist cannot be afforded to watch over the dosage of coagulants and pH control to build an optimum floc at all times. D.E. works regardless of changes in the water quality that upset conventional coagulation plus clarification and sand filtration.

2) D.E. particles are so small that they are effective for turbidity removal by simple straining. Rapid sand filters are dependent upon coagulation to neutralize the charges on the turbidity particles so that they can be removed by electrostatic attachment to the sand grains.

3) D.E. sludge in a simple impoundment dewaters very fast and may be used as a soil conditioner, whereas conventional treatment produces a dilute sloppy sludge that dewaters very poorly. High pressure filter presses usually do not produce cakes with more than 30% solids.

When D.E. is used without coagulation, it will remove particles as small as 0.5 microns by the simple mechanism of straining but smaller particles will pass through the filter bed. Usually these smaller particles represent a small proportion of the total turbidity, but when the total turbidity is high, the % below 0.5 microns will also increase. In that case, the concentration of fine turbidity may exceed the IESWTR limits for turbidity. That would require addition of alum or polymers to the filter feed to coagulate the fines.

Alum addition can be a tool to use when upsets in raw water quality prevent the filter from meeting the IESWTR turbidity limits but extra flow capacity will be needed to compensate for the frequent outages for precoat renewal. Tests done at Colorado State University in Fort Collins in 1984 documented the benefits of adding alum to the D.E. bodyfeed tank to enhance turbidity removal. Kelly Lange, Bill Bellamy, and Davis Hendricks showed that 5% by weight ratio of alum to D.E. added to the bodyfeed slurry would improve turbidity removal 1 log and viruses up to 2 log, but the D.E. consumption increased dramatically, because of the extra sludge.

4) The invention at hand can be adapted to a method of filtering recycled backwash water. The first step in backwash water treatment is to provide a lined holding basin in which the heavy solids settle out. The next step is drawing off the supernatant to the plant inlet. When the sludge level in the basin rises to a point where it interferes with retention time, the backwash can be diverted to a new pond. The sludge in the first pond would be allowed to dry out so it can be loaded into a truck and taken to landfill.

The next step is adding the supernatant from the backwash impoundment to a precoated leaf filter 80 to produce water that would be better than raw water quality. This water is suitable for direct recycle to coagulation and clarification treatment.

The invention can be applied to other applications beyond water filtration that require large volumes of filter aid. In particular, the invention can be applied in areas such as cane, corn, and beet sugar, kelp, beer, wine, apple juice, and various pharmaceutical Typically, the use of filter aids in these applications is to polish the last ten to five-hundred parts per million (10–500 ppm) of suspended solids out of the liquid before a final guard filter that prepares the liquid for pasteurization, bottling, evaporation, or other processing.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus for sterilizing and recycling filter aid in a pressurized leaf filter having a vessel, a manifold separating said vessel into two sides, at least one leaf sealably connected to said manifold, a filter cake of a filter aid covering said leaf, a filter inlet for introducing a body feed, said body feed containing material to be filtered and a quantity of filter aid, and a filter outlet on the side opposing said leaf, wherein the apparatus comprises:

means for heating said filter cake while in place on said leaf, said heating being sufficient to form a sterilized filter cake by eliminating substantially all pathogenic activity in substantially all of said filter cake;

a recovery tank;

means for removing said sterilized filter cake from said vessel to said recovery tank;

means for mixing said sterilized filter cake with water in said recovery tank to form a sterilized filter aid slurry containing sterilized filter aid and sterilized sludge;

means for separating said sterilized sludge from said sterilized filter aid to form a de-sludged, sterilized, recycled filter aid;

a mixing station connected to said filter inlet and adapted for mixing said quantity of filter aid with said material to be filtered to form said body feed; and means for delivering said recycled filter aid to said mixing station for re-use in said body feed.

2. An apparatus as described in claim 1, wherein said means for heating said filter cake includes a heat sterilizing medium that is forced through said filter cake.

3. An apparatus as described in claim 1, wherein said means for heating said filter cake includes steam.

4. An apparatus as described in claim 1, wherein said means for heating said filter cake includes superheated steam.

5. An apparatus as described in claim 1, wherein said means for heating said filter cake includes wet steam having a temperature of at least about one-hundred-sixty degrees Fahrenheit.

6. An apparatus as described in claim 1, wherein said means for heating said filter cake is air having a temperature of at least one-hundred-sixty degrees Fahrenheit.

7. An apparatus as described in claim 1, wherein said means for heating said filter cake is water having a temperature of at least one-hundred-sixty degrees Fahrenheit.

8. An apparatus as described in claim 1 further comprising:

a temperature sensor in said filter outlet.

9. An apparatus as described in claim 1 wherein said filter aid is chosen from the group consisting of diatomaceous earth, perlite, cellulose, amorphous silica from rice hull ash, and microbeads.

10. An apparatus for sterilizing and recycling filter aid in a pressurized leaf filter having a vessel, a manifold separating said vessel into two sides, at least one leaf sealably connected to said manifold, a filter cake of a diatomaceous earth filter aid covering said leaf, a filter inlet for introducing a body feed, said body feed containing material to be filtered and a quantity of said filter aid, and a filter outlet on the side opposing said leaf, wherein said apparatus comprises:

means for applying wet steam for heating said filter cake while in place on said leaf, wherein said wet steam is forced through said filter cake, said heating being sufficient to form a sterilized filter cake by eliminating substantially all pathogenic activity in substantially all of said filter cake;

a temperature sensor in said filter outlet;

a recovery tank;

means for removing said sterilized filter cake from said vessel to said recovery tank;

means for mixing said sterilizing filter cake with water in said recovery tank to form a sterilized filter aid slurry containing sterilized filter aid and sterilized sludge;

means for separating said sterilized sludge from said sterilized filter aid to form a de-sludged, sterilized, recycled filter aid;

a mixing station connected to said filter inlet and adapted for mixing said quantity of filter aid with said material to be filtered to form said body feed; and means for delivering said recycled filter aid to said mixing station for re-use in said body feed.

11. An apparatus for filtering comprising:

a filter having a vessel;

a filter cake of filter aid on said filter;

a filter inlet for introducing a body feed to said filter, said body feed containing material to be filtered and a quantity of said filter aid;

a filter outlet;

means for heating said filter cake while in place on said filter to a sterilization temperature to form a sterilized filter cake;

means for removing said sterilized filter cake from said vessel;

means for mixing said sterilizing filter cake with water to form a sterilized filter aid slurry containing sterilized filter aid and sterilized sludge;

means for separating said sterilized sludge from said sterilized filter aid to form a de-sludged, sterilized, recycled filter aid;

a mixing station connected to said filter inlet and adapted for mixing said quantity of filter aid with said material to be filtered to form said body feed; and means for delivering said recycled filter aid to said mixing station for re-use in said body feed.

12. An apparatus as described in claim 11, wherein said filter is chosen from the group of filters consisting of pressure leaf filters, filter presses, tube filters, vacuum leaf filters, horizontal vacuum belt filters, rotary vacuum drum filters, disc filters, multiple tube candle filters, and Larox type indexing horizontal pressure filter presses.

13. An apparatus as described in claim 11, wherein said means for heating said filter cake includes steam.

14. An apparatus as described in claim 11, wherein said means for heating said filter cake includes superheated steam.

15. An apparatus as described in claim 11, wherein said means for heating said filter cake includes wet steam.

16. An apparatus as described in claim 11, wherein said means for heating said filter cake includes air having a temperature of at least one-hundred-sixty degrees Fahrenheit.

17. An apparatus as described in claim 11, wherein said means for heating said filter cake includes water having a temperature of at least one-hundred-sixty degrees Fahrenheit.

18. An apparatus as described in claim 11 further comprising:
 a filter outlet, and
 a temperature sensor in said filter outlet.

19. An apparatus as described in claim 11, wherein said filter aid is chosen from the group consisting of diatomaceous earth, perlite, cellulose, amorphous silica from rice hull ash, and microbeads.

20. An apparatus as described in claim 11 further comprising:
 a means for measuring the completeness of sterilization.

* * * * *